US005728209A

United States Patent [19]
Bury et al.

[11] Patent Number: 5,728,209
[45] Date of Patent: Mar. 17, 1998

[54] UNITIZED CEMENT ADMIXTURE

[75] Inventors: Jeffrey Bury, Macedonia; David F. Factor, Hiram; Zvi Grauer, Beachwood, all of Ohio

[73] Assignee: MBT Holding AG, Zurich, Switzerland

[21] Appl. No.: 911,836

[22] Filed: Aug. 15, 1997

Related U.S. Application Data

[60] Provisional application No. 60/001,634 Jul. 28, 1995.

Related U.S. Application Data

[63] Continuation of Ser. No. 685,383, Jul. 23, 1996, abandoned, which is a continuation-in-part of Ser. No. 556,366, Nov. 13, 1995, abandoned.

[51] Int. Cl.⁶ ............................................. C04B 18/02
[52] U.S. Cl. ................... 106/819; 106/638; 106/672; 106/673; 106/677; 106/705; 106/711; 106/713; 106/737; 106/738; 106/820; 106/821; 106/822; 106/823; 206/219
[58] Field of Search ........................... 106/672, 673, 106/677, 638, 705, 711, 713, 714, 737, 738, 819, 820, 821, 822, 823; 206/219

[56] References Cited

U.S. PATENT DOCUMENTS

| | | | |
|---|---|---|---|
| 4,961,790 | 10/1990 | Smith et al. | 106/823 |
| 5,203,629 | 4/1993 | Valle et al. | 366/2 |
| 5,320,851 | 6/1994 | De Mars et al. | 424/451 |

FOREIGN PATENT DOCUMENTS

| | | |
|---|---|---|
| 0191278 | 8/1986 | European Pat. Off. |
| 195 18 469 A1 | 11/1996 | Germany. |

OTHER PUBLICATIONS

Search Report in counterpart PCT application (application No. PCT/EP96/03315) (Jan. 1997).

*Primary Examiner*—Anthony Green
*Attorney, Agent, or Firm*—Renner, Kenner, Greive, Bobak, Taylor & Weber

[57] ABSTRACT

An additive for concrete, mortar or grout comprises at least one admixture material in a compacted unit of selected amount, the unit having strength sufficient to maintain structural integrity during handling and storage, but having sufficient solubility or friability upon mechanical agitation within a wet mixing environment of a cementitious composition mixture to dissolve or fragment for uniform dispersal throughout the cementitious composition mixture. A process for preparing a cementitious mixture includes providing ingredients i) at least one cementitious composition, ii) at least one admixture material and iii) a liquid; wherein the admixture material comprises at least one compacted unit having strength sufficient to maintain structural integrity during handling and storage, but having sufficient solubility or friability upon mechanical agitation within a wet mixing environment of the cementitious mixture to dissolve or fragment for uniform dispersal throughout said cementitious mixture; combining ingredients i), ii) and iii) and mixing in any order to dissolve or fragment the compacted unit to substantially disperse the admixture material throughout the other ingredients.

35 Claims, No Drawings

UNITIZED CEMENT ADMIXTURE

This application is a continuation of application Ser. No. 08/685,383 filed Jul. 23, 1996, now abandoned which is a continuation-in-part of U.S. Ser. No. 08/556,366, filed Nov. 13, 1995, and now abandoned which in turn claims the benefit of U.S. Provisional Application No. 60/001634, filed Jul. 28, 1995.

TECHNICAL FIELD OF THE INVENTION

The present invention is directed to admixture materials and a process for their introduction into cement, mortar or grout. More particularly, the present invention is directed to an article comprising unitized admixture materials of pre-selected amount, and a process for the introduction of the article into a cementitious composition for modifying or enhancing the properties of a resulting cementitious product.

BACKGROUND OF THE INVENTION

As known in the art, an admixture is a material other than hydraulic cement, water, and aggregate that is used as an ingredient of concrete or mortar and is added to the batch immediately before or during its mixing. Admixtures are used to modify the properties of the concrete in such a way as to make it more suitable for a particular purpose or for economy. Thus, the major reasons for using admixtures are (1) to achieve certain structural improvements in the resulting cured concrete; (2) to improve the quality of concrete through the successive stages of mixing, transporting, placing, and curing during adverse weather or traffic conditions; (3) to overcome certain emergencies during concreting operations; and (4) to reduce the cost of concrete construction. In some instances, the desired result can only be achieved by the use of an admixture. In addition, using an admixture allows the employment of less expensive construction methods or designs and thereby offsets the costs of the admixture.

For one example of an application of an admixture for use in concrete, at the end of a delivery, concrete mixers may contain from 200 to 600 pounds of residual cement, sand or rock. When left in the mixer overnight, the residual concrete will settle and harden in the bottom of the mixer. While the residual materials can be washed out of the mixer with a large amount of water, disposal of the liquid may cause an environmental problem, particularly in large metropolitan areas. To avoid this problem, it is desirable to delay or retard the setting of residual concrete in a mixer so that it remains fluid and the residual material can still be used the next day. It is also desirable to be able to delay or retard the setting of concrete in a mobile mixer while the mixer is being transported to another location. For specific applications, it may also be desirable to retard or delay the setting of concrete for a specific length of time, during breakdown or delay in traffic in populated areas. The addition of retarding admixture to the concrete is used to solve each of these problems. By varying the amounts of a retarding admixture used in a batch, the setting of the concrete can be delayed for a selected time period. The availability of a pre-weighed or pre-measured quantity of retarding admixture can increase the accuracy with which the setting time can be delayed.

Admixtures are commercially available as water-soluble solids or powders, requiring job mixing at the point of usage, or ready-to-use liquids added at bulk blending stations. The successful use of admixtures depends upon the accuracy with which they are prepared and batched. Batching means the weighing or volumetric measuring of the ingredients for a batch of either concrete or mortar and introducing them into the mixer. The amount of admixture added during batching must be carefully controlled. Inaccuracies in the amount of admixture added can significantly affect the properties and performance of the concrete being batched and even defeat the original purpose of including the admixture. The need for accuracy in measuring the amount of solid or even liquid admixture to be added to a batch is particularly acute where only a relatively small amount of admixture is required for the job.

Solid powdered admixtures are conventionally packaged and sold in bags, boxes and drums, and, conventionally, the admixture is added to the concrete mixture by opening the package and shoveling or dumping the admixture directly into a concrete mixer, or similar apparatus, during the concrete mixing operation. This labor intensive task is often messy and can be inaccurate within a particular mixer truck and/or between different trucks. Accordingly, it is desirable to have a method of dispersing admixture which is less labor intensive, less messy and more effective at uniformly dispersing or distributing the admixture throughout the cementitious composition mixture.

U.S. Pat. No. 4,961,790 to Smith et al discloses solid or powdered concrete admixture contained in a water soluble container which is released upon agitation in a wet mixer. The concrete is modified by the introduction of the pre-weighed admixture contained in the water soluble container and the agitation of the mix. The water soluble containers, or bags, are stored in water insoluble receptacles prior to use. Smith et al note that for powdered solid admixtures, it is particularly cumbersome to weigh the required amount of solid admixtures at the job site, because an additional scale or weighing apparatus must always be kept handy. Smith et al proposed using premeasured bags of concrete admixture to minimize human error in handling and preweighing the solid admixture.

U.S. Pat. No. 5,203,629 to Valle et al disclose a method for introducing a solid admixture, contained in a paper package, into a fresh concrete and mixing the fresh concrete in a batch type mixer to cause the packaging material to disintegrate and distribute the admixture throughout the fresh concrete.

U.S. Pat. No. 5,320,851 to DeMars et al disclose a gelatin or wax encapsulated packaging and dispensing system for semi fluid or fluid concrete and cement admixtures. The encapsulated capsule of the semi fluid, fluid or perhaps solid admixture is intended to disintegrate or rupture when mechanically agitated and/or exposed to cementitious compositions. The disclosures of U.S. Pat. Nos. 4,961,790; 5,203,629; and, 5,320,851 are incorporated herein as if fully written out below.

Although the above noted patents describe attempts to overcome the difficulties involved with the handling, measuring and introduction of free flowing fluid, semifluid or solid admixture to cementitious compositions, several disadvantages remain with their proposed solutions. Each individual package, paper bag, or capsule must be individually weighed, filled and sealed. Care must be taken not to rupture the container prior to introduction into the cementitious mixture. If premature rupture does occur, contamination and/or dusting problems associated with conventional processing also occurs. On the other hand, depending upon the cementitious mix or composition which is being mixed, it is possible that containers may not break when introduced into the mix, or may break at the time of the cessation of mixing and pouring of the mixture, resulting in the failure of the admixture to fully disperse among the cementitious composition. This results in the property, which was intended to be enhanced or modified, not being obtained for the cementitious product, as well as resulting in the localized weakening of the product in view of a concentration of admixture in the vicinity of the unopened or partially dispersed package of admixture.

Other difficulties which are not addressed by the above patents include the introduction of materials which are extraneous to conventional concrete processing being introduced into the cementitious mixture, such as paper bags (Valle et at) or soluble bags (Smith et al), or wax capsules (DeMars et al). Also, ease of handling is only partially addressed by these patents. For example, multiple capsules of DeMars et al are not easily carried or balanced by a worker while climbing a ladder onto a concrete mixer to the access port. The storage of such capsules is also bulky and inconvenient in quantity.

It is therefore an object of the present invention to provide a unitized cement admixture article of preselected amount for the introduction into a cementitious composition, which avoids dusting and contamination problems associated with free flowing materials, and overcomes the need for using individual packages or containers for each dose of admixture, which are susceptible to premature rupture, such packages or containers being composed of materials extraneous to the intended cementitious product.

SUMMARY OF THE INVENTION

The present invention relates to the modification of the properties of a concrete, mortar or grout, by introducing an admixture into a fresh cementitious composition. The admixture may include at least one of air-entraining admixtures, air detrainer admixture, accelerating admixture, alkali-reactivity reducer, superplasticizer, pumping aids, water-reducing admixture, corrosion inhibitor, permeability reducer, grouting agents, gas formers, retarding admixtures, bonding admixtures, colorants, biocidals, fibers, minerals, and mixtures thereof. The fresh cementitious composition, to which the admixture is introduced, is mixed for sufficient time to cause the admixture to be dispersed relatively uniformly throughout the fresh concrete.

The present invention provides an additive for concrete, mortar or grout comprising at least one admixture material wherein the admixture comprises a compacted unit of a selected amount of the admixture material, having strength sufficient to maintain structural integrity during handling and storage, but having sufficient solubility or friability upon mechanical agitation within a wet mixing environment of a cementitious composition mixture to dissolve or fragment for uniform dispersal throughout said cementitious composition mixture.

In a preferred embodiment, the admixture material is a powder or flake portland cement admixture material. In another preferred embodiment, the compacted unit contains inert filler as means for facilitating unitization or fragmentation of the admixture material. In yet another preferred embodiment, the admixture material is a liquid admixture material adsorbed onto a solid carrier, such as an inert filler. In another embodiment, the unit is severable into selected, structurally stable fractions. An exemplative cementitious composition capable of modification by the use of an additive according to the present invention is a controlled low strength material (CLSM).

The present invention further includes an additive for concrete, mortar or grout prepared by
 a) providing a selected amount of admixture material, and
 b) compacting the admixture material into a unit having structural stability for handling and storage, but retaining sufficient solubility or friability for dissolving or fragmenting upon mechanical agitation within a wet mixing environment of a cementitious composition mixture.

Certain additives may be advantageously prepared by adding a liquid to a premeasured amount of powder or flake admixture prior to compacting. In a preferred embodiment of the invention, the admixture material is compacted in combination with an inert filler. In another preferred embodiment, a liquid admixture is adsorbed onto a solid carrier prior to compacting. The additive according to the present invention may be compacted by molding, extrusion molding, pressing, tabletting, or the like.

The present invention also includes a process for preparing a cementitious mixture including
 a) providing at least one cementitious composition and a liquid,
 b) at least partially mixing the cementitious composition and the liquid;
 c) introducing at least one admixture material to the at least partially mixed cementitious composition,
wherein the at least one admixture material comprises at least one compacted unit of a selected amount of the admixture material, having strength sufficient to maintain structural integrity during handling and storage, but having sufficient solubility or friability upon mechanical agitation within a wet mixing environment of the cementitious composition mixture to dissolve or fragment for uniform dispersal throughout the cementitious composition mixture, and
 d) mixing the at least partially mixed cementitious composition and the at least one compacted unit to dissolve or fragment the at least one compacted unit to substantially disperse the admixture material throughout the cementitious composition.

The present invention further includes a process for preparing a cementitious mixture including
 a) providing ingredients
  i) at least one cementitious composition
  ii) at least one admixture material and
  iii) a liquid;
wherein the at least one admixture material comprises at least one compacted unit of a selected amount of the admixture material, having strength sufficient to maintain structural integrity during handling and storage, but having sufficient solubility or friability upon mechanical agitation within a wet mixing environment of a cementitious composition mixture to dissolve or fragment for uniform dispersal throughout said cementitious composition mixture; and
 b) combining ingredients i), ii) and iii) and
 c) mixing the ingredients to dissolve or fragment the at least one compacted unit to substantially disperse the admixture material throughout the ingredients i) and iii).

It is generally possible to introduce the ingredients in any order as well as combining 2 or more ingredients prior to, during or after one or more mixing cycles.

BRIEF DESCRIPTION OF THE DRAWINGS

FIG. 1 is an elevational perspective view of a severable admixture material compacted unit.

FIG. 2 is a graphical representation of the percent air (gravimetric analysis) generated in cementitious composition mixtures over time for air entrainment admixture introduced as a powder and as varyingly compacted units.

FIG. 3 is a graphical representation of air loss (percent air—pressure reading) in cementitious composition mixtures over time for air entrainment admixture introduced as a powder and in a compacted unit.

FIG. 4 is a graphical representation of the solubility of admixture compacted units versus filler percentage and compaction load.

DETAILED DESCRIPTION OF THE INVENTION

As used herein, the term "effective amount" of admixtures means an adequate quantity of material per cubic yard of hardened concrete to impart the desired improvement in the wet or dry concrete. Often, more than one unit of admixture material is added to the cementitious composition being processed in a commercial concrete mixer. As a result, the total amount of admixture must "cumulatively" result in an effective amount. When, according to the invention, admixture material is added to a cementitious composition mixture in a compacted unit, the same effective amount of active admixture material is added as would be added according to the conventional poured or pumped systems.

As used herein, the term "uniform dispersal" or "relatively uniform distribution" means that the admixture is distributed in such a manner that the desired property, i.e. air entrainment, retardation, acceleration, etc., can be observed or measured in samples taken from the beginning, middle and end of the concrete mixture.

As used herein, the term "batch type concrete mixer" means any batch mixer suitable for thoroughly mixing cement and aggregate so as to obtain a homogeneous mass and coat all particles with cement paste. Preferred concrete mixers are: (1) rotating mixers, consisting of a revolving drum or a square box revolving about its diagonal axis and usually provided with deflectors and blades to improve the mixing; or (2) paddle mixers, consisting of a stationary box with movable paddles which perform the mixing. Rotating mixers are most preferred for use in the present invention.

The method of the present invention allows a selected amount of flake or powder admixture to be added or dispensed into a wet mixer expediently, economically and accurately, as a solid, compacted unit. Additionally, according to the present invention, conventional liquid admixture material can be added or dispersed into a wet mixer as a solid, compacted unit, as detailed below.

Some admixtures are used to modify the fluid properties of fresh concrete, mortar and grout, while others are used to modify hardened concrete, mortar, and grout. The various admixtures used in the present invention are materials that can be used in concrete mortar or grout for the following purposes: (1) to increase workability without increasing water content or to decrease the water content at the same workability: (2) to retard or accelerate the time of initial setting; (3) to reduce or prevent settlement of the finished material or to create slight expansion thereof; (4) to modify the rate and/or capacity for bleeding; (5) to reduce segregation of constituent ingredients; (6) to improve penetration and pumpability; (7) to reduce the rate of slump loss; (8) to retard or reduce heat evolution during early hardening; (9) to accelerate the rate of strength development at early stages; (10) to increase the strength of the finished material (compressive, tensile, or flexural); (11) to increase durability or resistance to severe conditions of atmospheric exposure, including application of deicing salts; (12) to decrease the capillary flow of water within the material; (13) to decrease permeability of the material to liquids; (14) to control expansion caused by the reaction of alkali with certain aggregate constituents; (15) to produce cellular concrete; (16) to increase the bonding of concrete to steel reinforcing elements; (17) to increase the bonding between old and new concrete; (18) to improve the impact resistance and abrasion resistance of finished materials; (19) to inhibit the corrosion of embedded metal; (20) to produce colored concrete or mortar; and (21) to introduce natural or synthetic fibers to reinforce concrete.

Concrete admixtures are classified by function as follows: Accelerators are used to accelerate the setting and early strength development of concrete. Some of the common materials that can be used to achieve this function are calcium chloride, triethanolamine, sodium thiocyanate, calcium formate, calcium nitrite, and calcium nitrate.

Retarding, or delayed-setting, admixtures are used to retard, delay, or slow the rate of setting of concrete. They can be added to the concrete mix upon initial batching or sometime after the hydration process has begun. Retarders are used to offset the accelerating effect of hot weather on the setting of concrete, or delay the initial set of concrete or grout when difficult conditions of placement occur, or problems of delivery to the job site, or to allow time for special finishing processes or to aid in the reclamation of concrete left over at the end of the work day. Most retarders also act as water reducers and can also be used to entrain some air into concrete. Lignosulfonates, hydroxylated carboxylic acids, lignin, borax, gluconic, tartaric and other organic acids and their corresponding salts, phosphonates, certain carbohydrates and mixtures thereof can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents; salts of sulfonated lignin; salts of petroleum acids; salts of proteinaceous material; fatty and resinous acids and their salts; alkylbenzene sulfonates; and salts of sulfonated hydrocarbons.

Alkali-reactivity reducers can reduce alkali-aggregate expansion of these reducers, pozzolans (fly ash, silica fume), blast-furnace slag, salts of lithium and barium, and other air-entraining agents are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ratio of water and cement, or to increase slump. Typically, water reducers will reduce the water content of the concrete mixture by approximately 5% to 10%.

Superplasticizers are high-range water reducers, or water-reducing admixtures. They are added to concrete to make high-slump flowing concrete, and thus reduce the water-cement ratio. These admixtures produce large water reduction or great flowability without causing undue set retardation or entrainment of air in mortar or concrete. Among the materials that can be used as superplasticizers are sulfonated melamine formaldehyde condensates, sulfonated naphthalene formaldehyde condensates, certain organic acids, lignosulfonates, and/or blends thereof.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Grouting agents, such as air-entraining admixtures, accelerators, retarders, and non-shrink and workability agents, adjust grout properties to achieve a desired result for specific applications. For example, portland cement grouts are used for a variety of different purposes, each of which may require a different agent to stabilize foundations, set machine bases, fill cracks and joints in concrete work, cement oil wells, fill cores of masonry walls, and grout pre-stressing tendons and anchor bolts, and fill the voids in pre-placed aggregate concrete.

Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous or siliceous and aluminous material, which in itself possesses little or no cementitious value. However, in finely divided form and in the presence of moisture, pozzolan will chemically react with calcium hydroxide at ordinary temperatures to form compounds possessing cementitious properties.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Fresh concrete can sometimes be harsh because of faulty mixture proportions or certain aggregate characteristics such as particle shape and improper grading. Under these conditions, entrained air which acts like a lubricant, can be used as a workability improving agent. Other workability agents are water reducers and certain finely divided admixtures.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker, consisting essentially of hydraulic calcium silicates, all usually containing one or more of the forms of calcium sulfate as an interground addition with ASTM types, I, II, III, IV, or V. The finely divided mineral admixtures can be classified according to their chemical or physical properties as: cementitious materials; pozzolans; pozzonaic and cementitious materials; and nominally inert materials. Cementitious materials are materials that alone have hydraulic cementing properties, and set and harden in the presence of water. Included in cementitious materials are ground granulated blast-furnace slag, natural cement, hydraulic hydrated time, and combinations of these and other materials. As discussed above, pozzolan is a siliceous or aluminosiliceous material that possesses little or no cementitious value but will, in the presence of water and in finely divided form, chemically react with the calcium hydroxide released by the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestones, marble, granite, and others.

In the construction field, many methods of strengthening concrete have been developed through the years. One modern method involves distributing fibers throughout a fresh concrete mixture. Upon hardening, this concrete is referred to as fiber-reinforced concrete. Fibers can be made of zirconium materials, steel, fiberglass, or synthetic materials, e.g., polypropylene, nylon, polyethylene, polyester, rayon, high-strength aramid, (i.e. Kevlar®), or mixtures thereof. Preferred fibers of the present invention are synthetic fibers.

Mixtures of two or more admixtures are also contemplated by the present invention.

The present invention provides a means for introducing liquid or solid, e.g., powder or flake, admixtures for concrete, mortar or grout to a cementitious composition. The cementitious composition may include a cement composition for the production of a concrete, mortar or grout, but is preferably a hydraulic cement and most preferably is a portland cement.

Other potential ingredients for forming the cementitious composition mixtures include aggregate, sand, pozzolans, fly ash, fibers, plastic, and the like. A liquid, primarily water, is an ingredient of the cementitious composition mixture.

The admixture, according to one embodiment of the invention, comprises powder or flake materials that have been compressed or otherwise molded under pressure into a generally cylindrical or briquette shaped unit. The particular shape of the unit is not critical, but it is advantageously of a shape which is capable of packing in a minimum volume so as to optimize storage considerations. One such advantageous shape is a cube or rectangular polygon.

For admixture materials which are too "dry" to form structurally stable compacts, it may be desirable to add a liquid, such as a (poly)ethylene glycol or (poly)propylene glycol, a liquid binder, and/or preferably water, to a pre-measured amount of powder or flake admixture, in an amount which is sufficient to dampen and thus provide adhesion of the admixture material under pressure, but does not result in the dissolution of the admixture material or fragmenting of the compacted unit prior to introduction into the wet cementitious composition mixture environment.

Suitable binders, which are one means for maintaining structural stability of the admixture materials, include but are not limited to celluloses such as carboxymethylcellulose (CMC) and ethylcellulose, starches including pregelatinized starch, dextrin, maltodextrin, natural gums, polyvinyl alcohols, polyvinyl acetates, (poly)ethylene glycols, (poly) propylenes, clays such as bentonite, sugars such as liquid glucose, gelatin, guar gum, acacia gum, alginic acid, alginates such as sodium alginate, magnesium aluminum silicate, crosslinked polyacrylates such as Carbomer, polyvinyl pyrrolidones such as povidone, and Zein.

It is preferable to add inert fillers to the admixture materials for compaction to i) render individual units structurally stable physically for physical handling and storage, and/or ii) facilitate the rapid breakdown by dissolution and/or fragmentation, of the unit when added to a (wet) cementitious composition mixture (e.g. cement, aggregate, water, etc.) which is being mechanically mixed or agitated. These characteristics are obtained by balancing the addition percentage of inert filler and the compacting pressure, to provide an admixture material unit of desired physical integrity and stability, and of desired solubility, friability or fragmentability. The filler, therefore, is included as means for maintaining structural stability as well as means for facilitating dissolution and fragmenting of the admixture material.

Examples of suitable fillers include silica sand, silica fume, other natural or synthetic silica-based materials, Micro-Cell E silica (Celite Corp.), silicates, calcium aluminosilicate, aluminosilicates, clays, alumina, Alundum aluminosilicates (Norton), zeolites, ceramic spheres, fly ash, calcium carbonate (limestone powder), finely divided or powdered plastic, calcium sulfate, compressible sugar, confectioner's sugar, dextrates, dextrin, dextrose, dibasic calcium phosphate dihydrate, hydrogenated vegetable oil, kaolin, lactose, magnesium carbonate, magnesium oxide, maltodextrin, mannitol, cellulose, polymethacrylate, potassium chloride, powdered cellulose, starch, talc and tribasic calcium phosphate.

Known methods of compacting powdered or flake solid materials may be used to produce the compacted admixture material units. Examples of such methods include extrusion molding of the admixture material, pressing, stamping or tabletting, and molding, such as by melting and pouring into a shaped mold, with or without added binder or filler. The latter molding technique may be utilized in the presence of a binder, but without compaction, to produce a unitized admixture article.

To prevent caking, anti-caking agents may be used. Suitable materials include, but are not limited to, fumed silica, colloidal silicon dioxide, magnesium trisilicate, talc, tribasic calcium phosphate, dibasic calcium phosphate dihydrate and bentonite.

Glidants may also be useful in forming the compacted units of the instant invention. Suitable materials include, but are not limited to, colloidal silicon dioxide, magnesium trisilicate, powdered cellulose, starch, talc and tribasic calcium phosphate.

It may be desired to use lubricants in forming the compacted units. Suitable lubricants include, but are not limited to, calcium stearate, glyceryl monostearate, hydrogenated castor oil, light mineral oil, hydrogenated vegetable oil, magnesium stearate, mineral oil, polyethylene glycol, sodium benzoate, sodium laurel sulfate, sodium stearyl fumarate, stearic acid, talc and zinc stearate.

Where it is desired to accelerate the disintegration of the compacted admixture materials of the present invention, a disintegrant may be added to the admixture prior to compaction. Broadly, there are two types of disintegrants which may be useful:

i) materials that swell upon contact with water—the expansion of these materials upon contact with water creates stress on the compacted unit thereby aiding its breakdown; and ii) materials which generate gas, i.e. gas release agents, when contacted with water at the appropriate pH—the gas release aids the breakdown of the compacted unit.

Any materials which swell upon contact with water may be used provided they do not adversely affect the cementitious mix. Suitable materials include, but are not limited to, alginic acid and salts thereof such as sodium alginate, calcium or sodium carboxymethylcellulose, colloidal silicon dioxide, sodium Croscarmellose, guar gum, magnesium aluminum silicate, methylcellulose, microcrystalline cellulose, starch, bentonite and super absorbing polymers such as crosslinked poly(vinyl pyrrolidone), e.g. CrosPovidone, crosslinked polyacrylic acid or polyacrylate, maleic anhydride copolymers, cellulosic polymers, polyvinyl alcohol and similar materials.

Suitable gas release agents include oxygen release agents such as hydrogen peroxide, sodium peroxide, organic peroxides, sodium perborate monohydrate and sodium percarbonate; hydrogen release agents such as sodium borohydride, aluminum powder, lithium aluminum hydride and calcium hydride; and effervescent systems, e.g. those that release carbon dioxide as the product of the reaction between an acid and a carbonate. Materials useful as the acid source include, but are not limited to, citric acid, tartaric acid, malic acid, adipic acid, succinic acid, acid anhydrides such as sodium dihydrogen phosphate, disodium dihydrogen pyrophosphate and sodium bisulfite. Carbonate sources include, but are not limited to, sodium bicarbonate, sodium carbonate, potassium bicarbonate, potassium carbonate, sodium sesquicarbonate and sodium glycine carbonate.

In another embodiment of the present invention, liquid admixture materials are processed into solid compacted units by adsorbing the liquid admixture materials onto carriers. The carriers may advantageously be the inert fillers described above. The carriers are contacted by the liquid admixture materials, and preferably at least partially dried, such as by air drying, prior to compacting the admixture containing carriers.

In yet another embodiment of the present invention, soluble solid admixture materials are dissolved in a suitable liquid solvent, such as water, and the resulting solution is impregnated or adsorbed onto carriers by contacting the carrier with the solution, and preferably at least partially drying, prior to compacting the admixture containing carriers. The carriers may advantageously be the inert fillers described above. Similarly, insoluble solid admixture may be slurried in a liquid and the carrier contacted with the slurry to form a coated carrier prior to compacting.

The admixture material units, according to the present invention, are sized so as to deliver a selected amount of pre-measured active admixture material to a desired or standardized volume of cementitious composition mixture. Admixture can be added to the cementitious mixture in a batch type concrete mixer at a central batch plant, where conventional admixture materials must be weighed, measured and poured, or as advantageously enabled by the present invention, can be added directly to a batch type concrete mixer truck or ready mix truck, at the job site. Unlike conventional admixture material, adding the compacted units of admixture material at the job site does not require weighing and pouring, such that dusting, spillage and contamination are avoided.

It is within the scope of the invention to use multiple units for a given volume of cementitious composition mixture. It is further within the scope of the present invention for the admixture material 11 to be compacted into a unit 10 which is severable, such as by providing perforations 12 of the compact or the like, to provide selected, structurally stable fractions for smaller volumes of cementitious composition mixture, or to provide supplemental dosages of admixture which may be required because of the elapse of time from initial introduction and diminution of the desired effect. (FIG. 1.)

This advantage is not obtainable by the packaged admixture described in Smith et al, Valle et al, particularly in DeMars et al, in which breaking of the package would cause spillage of any unused solid or liquid admixture and potentially cause contamination.

For practical considerations, the unit size is preferably small, so as to provide the most efficient packing of the units in terms of units per box, or other container. A small size is preferable for handleability on a job site, for example, several small units being capable of being carried in a worker's pocket while the worker climbs a ladder onto a batch type concrete mixer (truck) to deliver the unit(s) into the mixer. A preferable size of the unit would be sufficient to deliver active admixture material for at least one to two cubic yards of cementitious composition mixture per unit. If a severable unit 10 is used, it may advantageously be sized to provide sufficient active admixture material 11 for at least four cubic yards of cementitious composition mixture, and be severable into two or more selected, structurally stable fractions.

As an example of the desirability to introduce admixture at a job site, for controlled low strength material (CLSM), a starting batch of cementitious composition mixture in a ready mix truck may typically be 4 to 6 cubic yards. When air entrainer admixture is added to the mixture, it expands in volume with the generation of 20–35% air, to 8 to 10 cubic yards. If required to be added at the central batch plant, the full load, with air, would be required to be transported by truck to the job site. The present invention permits a smaller volume to be transported, with volume expansion due to air entrainment being accomplished at the job site without requiring bulky admixture measuring and dispensing equipment to be transported from site to site.

For ease of handling and storability, the admixture material compacted units should be somewhat moisture resistant. Such moisture resistance may be imparted by the use of a binder in the formation of the compacted unit, preferably one which breaks down at a pH experienced by the unit in the wet cementitious composition mix, that is, pH 11 and above. For situations where the compacted units must be stored in a substantially water free environment, the units may be stored individually, but preferably in number, in a sealable plastic bag such as a Zip-Loc bag. Any water insoluble container, however, is suitable for such storage, so long as it is water-impermeable and is not water-degradable.

In one embodiment of the invention, the compacted unit is coated with a material that is at least partially insoluble in water. Coating the compacted unit with a material which is substantially insoluble in water, such as celluloses, clays, partially hydrolyzed starches, latexes, polyvinyl alcohols, polystyrenes, polyurethanes and the like, enhances the storage capabilities of the compacted unit in a moist environment, or would otherwise protect hydroscopic admixture material. Such a water-insoluble coating must be capable, however, of breaking or dissolving in the high pH, agitated mixing environment of the cementitious composition, and is preferably thin, on the order of about 1–10 mils. Also, the material may not be deleterious to the properties desired for the final product. The coating may be selected so as to protect the compacted unit, and/or to protect the user from an unfriendly material.

A cementitious mixture can be prepared according to the present invention, by providing at least one cementitious composition, such as a hydraulic cement and preferably portland cement, and a liquid, such as water, at least partially mixing the cementitious composition and the liquid, introducing at least one admixture material compacted unit into the at least partially mixed cementitious composition, and mixing the resulting combination to dissolve and/or fragment the unit in order to disperse the admixture material throughout the cementitious composition. Other materials, such as the ingredients set out above including aggregate, sand, fiber reinforcement, and the like, can be added to the mixture at an appropriate time.

In another embodiment, the ingredients i) at least one cementitious composition, ii) at least one admixture material compacted unit, and iii) a liquid, can be combined in any order, prior to, during, or after a mixing cycle, and thereafter mixed to dissolve and/or fragment the compacted unit, and/or substantially disperse the admixture material throughout the other ingredients to form a cementitious composition mixture.

EMBODIMENTS OF THE INVENTION

Strong compacted units of admixture material, having structural integrity for handling and storage but retaining solubility or friability to dissolve and/or fragment upon mechanical agitation or mixing were prepared from admixture materials in order to demonstrate the invention.

EXAMPLE A

Admixture material, linear dodecylbenzene sulfonate (Witconate LX, obtained from Witco Chemical, New York, N.Y.) was compacted into a physical unit using a Blaine Cell and plunger. 3.0 grams of dodecylbenzene sulfonate was compacted in the cell using heavy finger pressure. The material was compacted in a sturdy, small cylinder.

EXAMPLE B

Admixture material powder compaction was evaluated using several materials, with and without the addition of inert filler. The admixture powders and fillers (if any) were preblended prior to compacting by shaking in a closed container. The compaction process utilized a Blaine Cell and Penetrometer to apply known compression loads. The Blaine Cell was filled with powder and tapped to consolidate the material. The plunger was inserted and a load was applied using the number 2 pin in the Penetrometer. The plunger diameter was 0.4965 inches, providing a compacted unit, or pellet having a surface area of 0.1936 sq. in.

Table I describes the admixture materials which were tested according to this procedure, including the physical form before compaction, the loose weight, the compaction pressure used, the filler level utilized, if any, and the characteristics of the pellets which were produced. The admixture materials of examples B-2 to B-4 were obtained from Stepan Chemical Co. (Northfield, Ill.).

The Penetrometer compaction loads described throughout this specification relate to pounds per square inch according to the following Table A.

TABLE A

| Penetrometer Pounds | PSI | Description |
|---|---|---|
| 40 | 206 | Very low |
| 60 | 310 | Low |
| 80 | 413 | Medium |
| 100 | 516 | High |
| 180 | >900 | Very high |

TABLE I

COMPACTION

| Example No. | Material | Physical Form | Loose Wt. | Compaction Pressure (lbs) | Filler Level and Type | Pellet Characteristics |
|---|---|---|---|---|---|---|
| B-1 | Dodecyl Benzene Sulfonate | large waxy flake | 3.0 g | 180 | 10% Si Flour | strong, stable cylinder |
| B-2 | Alpha Olefin Sulfonate (Bio-Terge AS-90B) | slightly waxy powder | 3.0 g | 100 | 0 | stable, not waxy |
| B-3 | Linear Alkylbenzene sulfonate, (Nacconol 909) | small waxy flake | 3.0 g | 180 | 10% Si Fume | stable, strong, dark gray |
| B-4 | Alpha Olefin Sulfonate (Bio-Terge AS-90B) | slightly waxy powder | 3.0 g | 180 | 0 | stable, not waxy |

EXAMPLE C

An estimate was made of the size of a compacted pellet required in order to introduce 90 grams of alpha olefin sulfonate powder (Bio-Terge AS-90B) per cubic yard of cementitious mixture. A compacted pellet was made according to the procedure of example B-2, except that the pellet was compressed to 180 lbs. pressure. The 3 gram loose weight admixture material formed a pellet of 0.4965 inches diameter by 0.8125 inches length or, 0.1573 cubic inches (2.58 cubic centimeters). The compacted density was 1.163 grams per cubic centimeter. For a 90 gram compacted unit having 1 inch diameter, 77.386 cubic centimeters (4.722 cubic inches) would be required. The 1 inch diameter cylindrical unit at a compaction pressure of greater than 900 psi (Penetrometer-180 lbs), was estimated to require a unit having a height of 6.01 inches.

A study was conducted of compacted unit size requirements for a representative admixture material, the Bio-Terge AS90B alpha olefin sulfonate powder, with and without fine silica sand filler, at various compaction loads, active weight requirements, and cylindrical unit diameters. These are reported in Table II, together with the height of the cylindrical compacted unit required for the noted active weight and cylinder diameters for the compacted admixture material units obtained.

Although the size of the compacted units for one specific admixture material is included for purposes of exemplification, the size of compacted units of other admixture materials is not to be limited to these sizes. The only critical constraints upon the size of the compacted units are the dosage of active material needed to impart the desired property to a given amount of cementitious composition mixture, the amount of inert filler desired to impart structural stability and solubility/fragmentability, and the range of the pressures of compaction useful for making a stable, yet soluble/friable compact.

TABLE II

CYLINDRICAL UNIT PREPARATION SIZE ESTIMATES

| Example | Compact Load (lbs.) | Sand (wt. %) | Avg. L (cm) | Vol. (cc) | Wt. (g) | Density (g/cc) | Total cc Req. | Ht. (cm) | Ht. (in.) | Ht. (cm) | Ht. (in.) |
|---|---|---|---|---|---|---|---|---|---|---|---|
| | | | | | | | | Desired Cylinder Size | | | |
| | | | | | | | Loose Wt. Diameter | 90 (g) 2.2225 (cm) | 0.875 (in.) | 90 (g) 2.54 (cm) | 1 (in.) |
| C-1 | 60 | 0 | 2.425 | 3.03 | 2.46 | 0.812 | 110.813 | 28.56 | 11.25 | 21.87 | 8.61 |
| C-2 | 60 | 20 | 2.500 | 3.12 | 3.08 | 0.986 | 91.244 | 23.52 | 9.26 | 18.01 | 7.09 |
| C-3 | 80 | 0 | 2.133 | 2.66 | 2.46 | 0.923 | 97.470 | 25.12 | 9.89 | 19.24 | 7.57 |
| C-4 | 80 | 20 | 2.275 | 2.84 | 3.08 | 1.084 | 83.032 | 21.40 | 8.43 | 16.39 | 6.45 |
| C-5 | 100 | 0 | 1.942 | 2.43 | 2.46 | 1.014 | 88.742 | 22.87 | 9.01 | 17.51 | 6.90 |
| C-6 | 100 | 20 | 2.125 | 2.65 | 3.08 | 1.160 | 77.557 | 19.99 | 7.87 | 15.31 | 6.03 |
| | | | | | | | | Desired Cylinder Size | | | |
| | | | | | | | Loose Wt. Diameter | 95 (g) 2.2545 (cm) | 1 (in.) | 95 (g) 3.175 (cm) | 1.25 (in.) |
| C-7 | 60 | 0 | 2.425 | 3.03 | 2.46 | 0.812 | 116.970 | 23.08 | 9.09 | 14.77 | 5.82 |
| C-8 | 60 | 20 | 2.500 | 3.12 | 3.08 | 0.986 | 96.313 | 19.01 | 7.48 | 12.16 | 4.79 |
| C-9 | 80 | 0 | 2.133 | 2.66 | 2.46 | 0.923 | 102.885 | 20.30 | 7.99 | 12.99 | 5.12 |
| C-10 | 80 | 20 | 2.275 | 2.84 | 3.08 | 1.084 | 87.645 | 17.30 | 6.81 | 11.07 | 4.36 |
| C-11 | 100 | 0 | 1.942 | 2.43 | 2.46 | 1.014 | 93.672 | 18.49 | 7.28 | 11.83 | 4.66 |
| C-12 | 100 | 20 | 2.125 | 2.65 | 3.08 | 1.160 | 81.866 | 16.16 | 6.36 | 10.34 | 4.07 |
| | | | | | | | | Desired Cylinder Size | | | |
| | | | | | | | Loose Wt. Diameter | 100 (g) 3.175 (cm) | 1.25 (in.) | 100 (g) 3.81 (cm) | 1.5 (in.) |
| C-13 | 60 | 0 | 2.425 | 3.03 | 2.46 | 0.812 | 123.126 | 15.55 | 6.12 | 10.80 | 4.25 |
| C-14 | 60 | 20 | 2.500 | 3.12 | 3.08 | 0.986 | 101.382 | 12.81 | 5.04 | 8.89 | 3.50 |
| C-15 | 80 | 0 | 2.133 | 2.66 | 2.46 | 0.923 | 108.300 | 13.68 | 5.39 | 9.50 | 3.74 |

TABLE II-continued

CYLINDRICAL UNIT PREPARATION SIZE ESTIMATES

| Example | Compact Load (lbs.) | Sand (wt. %) | Avg. L (cm) | Vol. (cc) | Wt. (g) | Density (g/cc) | Total cc Req. | Ht. (cm) | Ht. (in.) | Ht. (cm) | Ht. (in.) |
|---|---|---|---|---|---|---|---|---|---|---|---|
| C-16 | 80  | 20 | 2.275 | 2.84 | 3.08 | 1.084 | 92.258 | 11.65 | 4.59 | 8.09 | 3.19 |
| C-17 | 100 | 0  | 1.942 | 2.43 | 2.46 | 1.014 | 98.602 | 12.45 | 4.90 | 8.65 | 3.40 |
| C-18 | 100 | 20 | 2.125 | 2.65 | 3.08 | 1.160 | 86.175 | 10.88 | 4.29 | 7.56 | 2.98 |

| | | | | | | | | Desired Cylinder Size | | | |
|---|---|---|---|---|---|---|---|---|---|---|---|
| | | | | | | | Loose Wt. Diameter | 110 (g) 3.81 (cm) | 1.5 (in.) | 110 (g) 2.2225 (cm) | 0.875 (in.) |
| C-19 | 60  | 0  | 2.425 | 3.03 | 2.46 | 0.812 | 135.439 | 11.88 | 4.68 | 34.91 | 13.74 |
| C-20 | 60  | 20 | 2.500 | 3.12 | 3.08 | 0.986 | 111.521 | 9.78  | 3.85 | 28.75 | 11.32 |
| C-21 | 80  | 0  | 2.133 | 2.66 | 2.46 | 0.923 | 119.130 | 10.45 | 4.11 | 30.71 | 12.09 |
| C-22 | 80  | 20 | 2.275 | 2.84 | 3.08 | 1.084 | 101.484 | 8.90  | 3.50 | 26.16 | 10.30 |
| C-23 | 100 | 0  | 1.942 | 2.43 | 2.46 | 1.014 | 108.463 | 9.51  | 3.75 | 27.96 | 11.01 |
| C-24 | 100 | 20 | 2.125 | 2.65 | 3.08 | 1.160 | 94.792  | 8.31  | 3.27 | 24.43 | 9.62  |

EXAMPLE D

The dose response of admixture liquid, powder, and compacted powder unit samples were evaluated to produce high air content ready mix mortar known as controlled low strength material (CLSM). The cementitious composition mixture was prepared using a high fly ash content, and the admixture material was prepared in three fluid ounce and six fluid ounce equivalent dosages, as discussed below, corrected for activity. Further, the effective mixing time using the liquid and powder admixture materials in a concrete mixture was evaluated at 5 minutes and 8 minutes. The compacted, or pelletized admixture material was evaluated at a mixing time of 12 and 17 minutes, to permit fragmenting and dissolution of the pellet.

Referring to Table III, the admixture material compositions identified were utilized for purposes of this demonstration. Table III indicates the percent activity of the admixture material, and the adjusted amount of grams necessary to provide an equivalent to 3 ounces and 6 ounces respectively of the commercial liquid admixture material (Cocamide DEA). Also described is the material dose for use in the mixture design, including the active percent per hundred pounds of cement, and grams per yard as well as the active grams per 175 pound batch, being equivalent to 3 and 6 fluid ounces of the above comparative admixture material.

Table IV describes the cementitious composition mixture design utilized for testing according to Example D, describing the ingredients, amounts in pounds per cubic yard, with volume and weight percent as well as the amounts in a 175 lb. batch and its corresponding volume.

TABLE III

ADMIXTURE

| Example Nos. | Admixture Materials | % Active | Adjusted grams for 3 oz. | Adjusted grams for 6 oz. |
|---|---|---|---|---|
| D1, D3 | Cocamide DEA (liquid) | 95.0 | 5.46 | 10.92 |
| D2, D4 | AS-90B - Alpha Olefin Sulfonate (powder) | 89.0 | 5.83 | 11.65 |
| D5 | AS-90B - Alpha Olefin (compacted unit) | 89.0 | 5.83 | 11.65 |

MATERIAL DOSE

| Fluid Oz. | Active Percent by Hundred Pounds Cement by Weight | Gr/Yd³ | Active Grams/Batch (175 lbs) |
|---|---|---|---|
| 3 | .099 | 90  | 5.19  |
| 6 | .198 | 180 | 10.37 |

TABLE IV

MIX DESIGN

| Cementitious Composition Ingredients | Specific Gravity | Pounds/ cubic yd. | Volume (ft³) | Weight % | 175 Pound Batch (Lbs) | Volume (ft³) |
|---|---|---|---|---|---|---|
| Ashgrove Type I | 3.15 | 50   | .2544   | 1.649  | 2.89   | .0147  |
| "F" Fly Ash     | 2.42 | 150  | .9933   | 4.946  | 8.66   | .0574  |
| Sand            | 2.60 | 2500 | 15.4093 | 82.427 | 144.25 | .8891  |
| Water           |      | 333  | 5.3365  | 10.979 | 19.21  | .3079  |
|                 |      | 3033 | 21.9935 |        | 175.00 | 1.2691 |

In Example D-5 a compacted pellet of the admixture material of Example D-2 was prepared such that the pellet size containing the powder and inert filler were such that two pellets would deliver the same dose as the 3 ounce equivalents above, and were compacted to 180 lbs. (Penetrometer)

2.92 grams of the alpha olefin sulfonate and 0.58 grams of silica flour were utilized for the test.

All cementitious composition mixture materials were batch mixed for one minute, each mix being run with the same water content. The liquid, powder and compacted admixture materials were then added, were mixed for 4 additional minutes (11 additional for compacted unit) and tested. No adjustment was made for the yield. The admixture containing mix was then mixed for an additional 3 minutes (5 for compacted unit) and tested for air entrainment. The tests and test results are listed in Table V. Percent air in this, and the following examples, was measured by an ASTM C231 type B pressure meter.

The tests demonstrate that compacted units of admixture material can provide equivalent properties as liquid and powder admixture. In Example D-5, it was determined that the particular filler used, silica flour, was too fine, and the compaction pressure of over 900 psi was too high, to provide equivalent performance in equal mixing times. Adjustment of filler type and compaction pressure was thereafter shown to produce a less hard, and therefore, more easily fragmented and dissolved compacted unit to reduce the required mixing time for the cementitious composition mixture.

As a point of comparison, the liquid admixture material of Examples D1 and D3 are conventionally delivered into a cementitious composition mix in a capsule as disclosed in U.S. Pat. No. 5,320,851. For purposes of the above-described test, the admixture material was delivered directly to the mixture, without an external capsule. If the capsule had been used to deliver the admixture for Examples D1 and D3, then additional mixing time would also have been required to rupture the capsule and disperse the admixture.

TABLE V

| Example No. | D-1 | D-2 | D-3 | D-4 | D-5 |
| --- | --- | --- | --- | --- | --- |
| admixture |
| equiv. oz/yd | 3.0 | 3.0 | 6.0 | 6.0 | 3.0 |
| % by cmt | 0.099 | 0.099 | 0.198 | 0.198 | 0.099 |
| cement (lbs/yd$^3$) | 51 | 48 | 51 | 47 | 51 |
| f fly ash (lbs/yd$^3$) | 153 | 145 | 152 | 141 | 152 |
| sand (lbs/yd$^3$) | 2546 | 2408 | 2528 | 2357 | 2535 |
| water (lbs/yd$^3$) | 339 | 321 | 337 | 314 | 338 |
| unit wt (8 min) (lbs/ft$^3$) | 114.4 | 108.2 | 113.6 | 105.9 | 113.9 |
| yield (yd$^3$) | 27.12 | 28.67 | 27.31 | 29.30 | 27.24 |
| slump @ 5 min (in.) | 8.75 | 9.25 | 9.75 | 9.75 | 7.75* |
| slump @ 8 min (in.) | 9.50 | 9.25 | 10.50 | 9.75 | 9.00* |
| % air @ 5 min | 13.5 | 15.6 | 13.5 | 17.0 | 12.5* |
| % air @ 8 min | 14.6 | 17.8 | 15.2 | 18.5 | 15.0* |
| gravi-metric air | 17.0 | 21.5 | 17.6 | 23.2 | 17.4 |

All mixes run with same water contents.
Admixtures added at 1 minute to wet mixture.
*Pelletized admixture sample was mixed for 12 and 17 minutes.

EXAMPLE E

One unit air entrainment admixture dosages, equivalent to 3 fluid ounces of cocamide DEA, were added to a controlled low strength material (CLSM) mixture containing Ashgrove Type I cement. The admixtures are identified as follows:

E-1 Bio-Terge AS-90B alpha olefin sulfonate powder.
E-2 Powder of E-1 compacted containing 30 weight % silica sand filler at 310 psi.
E-3 Cocamide DEA liquid surfactant (removed from capsule).

The mix water content was held constant for each mix with each admixture material being added after one minute mixing, to the wet mix. Air content was measured by an ASTM C231 type B pressure meter and gravimetrically, and slump was determined after 5 and 8 minutes of mixing. Test results are shown in Table VI.

TABLE VI

| Test | E-1 | E-2 | E-3 |
| --- | --- | --- | --- |
| % Air @ 5 min. | 21.0 | 13.0 | 21.0 |
| % Air @ 8 min. | 23.0 | 18.5 | 20.0 |
| GRAVIMETRIC AIR |
| @ 5 min. | 24.1 | 8.9 | 23.5 |
| @ 8 min. | 28.4 | 20.9 | 24.6 |
| SLUMP (inches) |
| @ 5 min. | 8.50 | 1.75 | 10.00 |
| @ 8 min. | 8.50 | 7.50 | 9.75 |

Although E-3 achieved air content with less mixing than compacted E-2, under these test conditions E-3 had a favorable bias in that it was added directly to the mix. This removed the capsule breakage and gradual release of the viscous surfactant from the time needed to generate air.

The powdered surfactant E-1 achieved higher air content values than the liquid for the same amount of mixing. It is therefore projected that with continued mixing, the compacted unit E-2 will generate air content values at least equivalent to those generated by E-1, and thus exceed the values for E-3.

EXAMPLE F

The effect of mix time on cementitious composition mixtures containing air entrainment admixture in powdered and compacted form was evaluated. The general mix design was as follows:

| Ingredient | Lbs/Yd$^3$ |
| --- | --- |
| Cement | 300 |
| Sand | 2232 |
| Water | 310 |
| Admixture | 3 (fluid oz. equivalents) |

Admixtures were added at 1 minute to the wet mix. Testing was done at 5 minutes, and then 3 at minute intervals. Admixture BioTerge AS90B alpha olefin sulfonate was prepared as follows.

| Example No. | % Filler | Penetrometer Compaction Load |
| --- | --- | --- |
| F-1 | 0 | 60 |
| F-2 | 20 | 60 |
| F-3 | 20 | 80 |
| F-4 | 0 | None |

The results of the tests are listed in Table VII, and are shown in FIG. 2, in which the percent air generation (gravimetric) is shown versus mix time for low and medium compacted units versus powder. From the graph, it can be seen that with only a 3 minute increased mixing time, the low pressure compacted admixture reached the level of air generation as the equivalent amount of powder.

TABLE VII

EFFECT OF MIX TIME COMPACTED VS. POWDER

| Example No. | F-1 | F-2 | F-3 | F-4 |
|---|---|---|---|---|
| Compact Level (lbs.) | 60 | 60 | 80 | POWDER |
| FILLER | 0 | 20 | 20 | 0 |
| % Air @ 5 min. | 14.5 | 15.0 | 15.0 | 20.0 |
| % Air @ 8 min. | 19.0 | 20.0 | 20.2 | 29.0 |
| % Air @ 11 min. | 22.0 | 23.0 | 23.0 | 30.0 |
| % Air @ 14 min. | 25.0 | 25.0 | 27.0 | 30.0 |
| % Air @ 17 min. | 27.0 | 28.0 | 28.0 | 35.0 |
| GRAVIMETRIC AIR | | | | |
| @ 5 min. | 15.1 | 16.7 | 16.7 | 22.8 |
| @ 8 min. | 20.9 | 22.1 | 21.9 | 24.5 |
| @ 11 min. | 24.8 | 26.1 | 25.9 | 31.8 |
| @ 14 min. | 28.9 | 30.3 | 29.8 | 35.0 |
| @ 17 min. | 31.8 | 33.8 | 29.5 | 37.5 |
| SLUMP (inches) | | | | |
| @ 5 min. | 7.25 | 7.75 | 8.00 | 9.25 |
| @ 8 min. | 8.75 | 8.50 | 8.25 | 9.25 |
| @ 11 min. | 8.50 | 8.50 | 8.25 | 9.25 |
| @ 14 min. | 9.00 | 8.75 | 9.00 | 9.00 |
| @ 17 min. | 8.75 | 9.50 | 9.00 | 9.00 |
| FINAL WT. (lbs/ft$^3$) | 106.2 | 104.6 | 105.6 | 101.8 |
| (Test Concrete Unit) @ 17 min. | | | | |

EXAMPLE G

A test was conducted to determine the amount of air present over time in an admixture-treated cementitious composition mixture. The admixture surfactant of Example F was added in equivalent dosages to the following cementitious composition mixtures as a powder and as a compacted unit. The compacted unit was prepared with 30% silica sand at 60 lbs. Penetrometer pressure (310 psi). The general mix design was as follows:

| Ingredient | Lbs/Yd$^3$ |
|---|---|
| Cement | 300 |
| Sand | 2232 |
| Water | 310 |

The percent water content was held constant for these mixes as tested. The admixtures were added at 1 minute to the wet mix. The mix was tested at 5 and 8 minutes at regular mix speed, and then at 15 minute intervals at slow mix speed, to demonstrate air loss in a batch type concrete mixer truck over a period of time. The results of the test are shown in FIG. 3, in which the low pressure, filler containing compacted unit achieved substantially the same air content in the cementitious mixture as the powdered air entrainment admixture material.

With regard to the air entrainment examples above, the additional ingredients to the cementitious composition mixture, namely fly ash and/or sand, were of the same type and grading within each example. It should be noted that the presence, type and quality of fly ash can influence air generation and loss, set time, and compressive strength. The sand grading can also affect air content and water demand, influencing set time and compressive strength performance.

EXAMPLE H

Compacted units of the air entrainment admixture powder of Example F were prepared to evaluate the effects of filler level and compacting load on the time required for complete dissolution of the sample. The three compacting loads and the three filler levels are shown below. Unit specimens were placed in beakers containing 300 mL of 70° F. tap water and mechanically stirred at slow speed. The use of a multiple position magnetic stir plate allowed 5 samples to be evaluated at the same time under identical conditions. The time required for total dissolution of the sample was recorded. It should be noted that this test provides a relative comparison of solubility only, as the amount of admixture being dissolved in the quantity of water for this test is substantially more than under actual CLSM mix conditions (2.46 g/300 mL vs. 90.0 g/300 pounds), and there was no sand or aggregate present during the test, as would be present in a cementitious composition mixture, to grind on the pellet and help to break it down. The times are thus longer than would be experienced in situ.

| Compacting Load (Penetrometer) | Filler Level (% by wt.) |
|---|---|
| Very low Penetrometer 40 pounds (206 psi) | None |
| Low Penetrometer 60 pounds (310 psi) | 20% |
| Medium Penetrometer 80 pounds (416 psi) | 40% |

As shown in FIG. 4, the dissolution time for samples without filler increases as the compacting load increases. For the Very Low compacting load, the addition of filler had little effect on the dissolution time. For the Low and Medium compacting loads, the addition of 20% filler had a significant effect on the dissolution time. With these compacting loads, the addition of 40% filler was not found to be better than 20% with regard to lowering the dissolution time.

EXAMPLE I

Compacted cylinder units of the admixture material of Example F were prepared to evaluate their physical stability under a variety of storage conditions. Multiple specimens were placed in either wirl-pak or Zip-Lock plastic bags in order to provide some protection from any outer packaging, closely simulating actual storage conditions.

Units were compacted using three compression load levels; Low (310 psi), Medium (413 psi), and High (516 psi). All of the specimens contained 20% by weight inert filler. The compacted cylinders of this admixture material had the texture or "feel" of a candle or crayon.

The storage conditions evaluated were: 70° F., 90° F., 120° F., and 70° F. in a moist room (100% humidity). The physical condition was monitored over time, specifically evaluating certain properties such as: softening, feel (stickiness), fusing (sticking together of specimens in the bag), and general breakdown of the specimen. For all "dry" temperature conditions, after 42 days, the compacted units exhibited no softening or fusing, good feel (not sticky), and no breakdown. Results of the moist room test are listed below.

| MOIST ROOM | | | | | |
|---|---|---|---|---|---|
| Sample | Day | Soft | Feel | Fuse | Break |
| Medium | 1 | no | very slight | no | no |
| Medium | 3 | no | very slight | no | no |
| Medium | 9 | slight | slight | no | no |
| Medium* | 16 | yes | slight | slight | no |
| Low | 1 | no | okay | no | no |
| Low | 6 | no | slight | no | no |
| Low | 18 | slight | slight | slight | no |
| Low | 28 | slight | slight | slight | no |
| High | 1 | no | okay | no | no |
| High | 8 | no | very slight | no | no |
| High | 18 | no | slight | slight | no |
| High | 28 | no | slight | slight | no |

*When placed in air for 3 days, the samples recovered their original firm, structural integrity.

weight and diameter of the resulting disc and the dissolution time of the compacted discs in a 400 ml saturated lime solution, except that in Example J-3, the compacted cylinder was added to 10 liters of a saturated lime solution. The dissolution time was visually measured. Examples J-1 and J-2 were compacted using an Instron materials testing machine, Model 4204, equipped with a 10,000 lb. load cell, in a compression mode at a rate of 0.2 inch/second. Example J-3 was compressed using a Satec Compression Machine, Model 400CTL, utilizing a Baldwin Universal Testing System controller available from Satec Systems, Inc., Grove City, Pa., while Examples J-4, J-5 and J-6 were handpressed using a hydraulic Buehler handpress.

TABLE VIII

| Example No. | Phosphonate (ADPA- 60SH) wt. % | Gluconate wt. % | Bentonite wt. % | Citric Acid wt. % | Sodium Bicarbonate wt. % | Compaction Pressure (psi) | Resulting DISC weight/ diameter | Time for dissolute (minutes) |
|---|---|---|---|---|---|---|---|---|
| J-1 | 15.3 | 15.3 | 15.3 | 23.1 | 31 | 5000 | 6.5 g/1.25 in. | 1 |
| J-2 | 15.3 | 15.3 | 15.3 | 23.1 | 31 | 5000 | 19.5 g/1.25 in. | 2 |
| J-3 | 15.3 | 15.3 | 15.3 | 23.1 | 31 | 5000 | 150 g/2.5 in. | 5 |
| J-4 | 24.4 | 63.4 | 12.2 | — | — | 7000 | 4.1 g/1.0 in. | 10 |
| J-5 | 50 | — | 25 | 25 | — | 6000 | 4.0 g/1.0 in. | 8 |
| J-6 | 40 | — | 20 | 20 | 20 | 7000 | 5.0 g/1.0 in. | 2–3 |

A further advantage of the compacted units of admixture material according to the present invention, is their avoidance of the tendency of liquid or semiliquid admixture materials to freeze, slush or separate at low temperature. As stated above, the use of compacted units of admixture according to the present invention overcomes job site dusting problems associated with powder admixture materials, avoids the use of bulky measuring dispensing equipment at the job site for liquid or solid free flowing admixture materials, and overcomes spillage concerns associated with conventional admixture materials.

Thus it is demonstrated that the objects of the present invention are met. The examples listed above are for illustrative purposes only and the present invention is not to be limited to them. It is to be understood that other admixtures, fillers, cementitious compositions and the like can be utilized according to the present invention, and thus, the selection of specific ingredients can be determined without departing from the spirit of the invention herein disclosed and described. Thus, the scope of the invention shall include all modifications and variations that may fall within the scope of the attached claims and equivalent embodiments.

EXAMPLE J

Six compacted units of a retarding admixture were prepared. The admixture materials were preblended with a binder, bentonite, then pressed into a compacted unit. In some instances, an effervescent blend of citric acid/sodium bicarbonate was used in order to accelerate dissolution of the compacted discs. It is noted that citric acid is also a known retarder for the cementitious mixes. Table VIII indicates the materials used, the amounts, the compaction pressure, the

EXAMPLE K

Three lab scale concrete mixes were prepared in order to evaluate and compare the retardation effect of two compacted retarding admixtures according to the present invention with a liquid retarding admixture. The three lab scale mixes were prepared such that the weights of materials per 1.0 cubic ft. of concrete were

| | |
|---|---|
| Medusa Type I cement | 21.5 lbs. |
| Concrete Sand | 55.6 lbs. |
| 1" limestone aggregate | 66.7 lbs. |
| Water | 11.89–12.98 lbs. |

The total mixing time was five minutes.

The admixtures added to the cement mixes were as follows:

K-1: Two solid discs, pressed at 7000 psi in a 1.0" diameter die using a Buehler hydraulic handpress. Each disc contained 0.64 g sodium gluconate, 0.24 g phosphonate (ADPA-6OSH, available from Albright and Wilson) and 1.17 g bentonite.

K-2: Two solid discs, prepared as above except each disc contained 0.77 g phosphonate (ADPA-60SH), 0.49 g citric acid, 0.49 g bentonite and 0.97 g sodium bicarbonate.

K-3: Liquid mixture containing 0.47 g sodium gluconate and 1.28 g phosphonate (ATMP, available from Monsanto) dosed at 12.7 mL per lab batch (equivalent to 2.0 fl. oz/cwt).

The solid admixtures, K-1 and K-2 were each added to different concrete batches 30 seconds after the concrete mixer was started while the liquid admixture, K-3 was added up front in the partial charge of mix water.

Initial set times, determined in accordance with ASTM C-403, were found to be

| Mix | Time |
|---|---|
| K-1 | 5 hr. 35 min. |
| K-2 | 6 hr. 5 min. |
| K-3 | 5 hr. 15 min. |

Thermal data (heat of hydration temperature vs. time) was collected for 24 hours with a data logger connected to thermocouples embedded in mortar screened from the above concrete mixes. The graphs for the three mixes overlapped and showed similar thermal behavior, indicating similar rates of hydration retardation.

EXAMPLE L

A retarding admixture compacted unit according to the present invention was prepared by combining the materials indicated in Table IX and compressing at 5000–6000 psi to give a 2⅝ inch diameter disc having a compacted density of approximately 1.41 g/cm$^3$.

| Material | Amount (wt. %) |
|---|---|
| Sodium Carbonate | 19.00 |
| CaHPO$_4$ -2H$_2$O | 3.00 |
| Sodium Gluconate | 20.25 |
| Citric acid | 37.50 |
| Phosphonate (ADPA-60SH) | 7.75 |
| Polyethylene glycol 3350 | 12.50 |

The dissolution time of the disc was found to be 4 min. 10 sec. The dissolution time was determined by placing the disc in approximately 10 liters of a saturated lime solution and visually determining the time it took for it to dissolve.

What is claimed is:

1. An additive for concrete, mortar, or grout comprising at least one admixture material wherein the additive comprises a compacted unit of an amount of said admixture material, said unit characterized by having strength sufficient to maintain structural integrity during handling and storage, but having at least one of sufficient solubility and sufficient friability upon mechanical agitation within a wet mixing environment of a cementitious composition mixture to at least one of dissolve and fragment for uniform dispersal throughout the cementitious composition mixture.

2. The additive of claim 1 wherein the cementitious composition mixture comprises a hydraulic cement.

3. The additive of claim 2 wherein the hydraulic cement comprises a portland cement.

4. The additive of claim 3 wherein the admixture material is at least one of the group consisting of powder portland cement admixture material and flake portland cement admixture material.

5. The additive of claim 1 wherein the compacted unit contains inert filler means for facilitating fragmentation of the admixture material compacted unit in said cementitious composition mixture.

6. The additive of claim 1 wherein the admixture material is a liquid admixture material adsorbed onto a solid carrier.

7. The additive of claim 6 wherein the carrier is an inert filler.

8. The additive of claim 1 wherein the compacted unit contains a solid carrier having a coating of at least one of powder admixture material and flake admixture material.

9. The additive of claim 1 wherein the compacted unit contains a binder.

10. The additive of claim 1 wherein the compacted unit has a coating of at least one of the group consisting of a water resistant material and a water insoluble material.

11. The additive of claim 1 wherein the compacted unit is water resistant at a pH less than about pH 11.

12. The additive of claim 1 wherein the compacted unit contains admixture material for effective dispersion into about 1 to about 2 cubic yards of the cementitious composition mixture.

13. The additive of claim 1 wherein the compacted unit contains the selected amount of said admixture material sufficient for effective dispersion of said admixture material into about 4 cubic yards of the cementitious composition mixture.

14. The additive of claim 1 wherein the compacted unit is severable into selected, structurally stable fractions.

15. The additive of claim 1 wherein the compacted unit contains a gas release agent selected from the group consisting of oxygen release agents, hydrogen release agents and effervescent systems.

16. The additive of claim 15 wherein the gas release agent is an effervescent system comprising an acid and a carbonate.

17. The additive of claim 1 wherein the compacted unit contains inert filler means for facilitating compaction of the admixture material into at least one structurally stable individual unit.

18. An additive for concrete, mortar, or grout prepared by
 a) providing an amount of admixture material,
 b) compacting the admixture material into a unit characterized by having structural stability for handling and storage, but retaining at least one of sufficient solubility and sufficient friability for at least one of dissolving and fragmenting upon mechanical agitation within a wet mixing environment of a cementitious composition mixture.

19. The additive of claim 18, including contacting a liquid with a premeasured amount of at least one of powder admixture material or flake admixture material prior to said compacting.

20. The additive of claim 19 wherein the liquid is provided in an amount sufficient to dampen but not dissolve said admixture material.

21. The additive of claim 19, including
 i) dissolving the admixture material in the liquid to form a solution, and
 ii) contacting a carrier with the solution.

22. The additive of claim 19, including
 i) slurrying the admixture material in the liquid to form a slurry, and
 ii) contacting a carrier with the slurry.

23. The additive of claim 18 including compacting the admixture material in combination with an inert filler.

24. The additive of claim 18 including adsorbing at least one liquid admixture material onto a solid carrier before compacting.

25. The additive of claim 18 including coating the compacted unit.

26. The additive of claim 18 wherein the compacting includes extrusion molding.

27. The additive of claim 18 wherein the compacting includes tabletting.

28. A process for preparing a cementitious mixture including a) providing at least one cementitious composition and a liquid, b) at least partially mixing the cementitious composition and the liquid;

c) introducing at least one admixture material to the at least partially mixed cementitious composition, wherein the at least one admixture material comprises at least one compacted unit of an amount of said admixture material, said unit characterized by having strength sufficient to maintain structural integrity during handling and storage, but having at least one of sufficient solubility and sufficient friability upon mechanical agitation within a wet mixing environment of a cementitious composition mixture to at least one of dissolve and fragment for uniform dispersal throughout the cementitious composition mixture, and d) mixing the at least partially mixed cementitious composition and the at least one compacted unit to at least one of dissolve and fragment the at least one compacted unit to substantially disperse the admixture material throughout the cementitious composition.

29. The process of claim 28 wherein the cementitious composition mixture contains water.

30. The process of claim 28 wherein the cementitious composition mixture additionally contains an ingredient other than the admixture material selected from the group consisting of aggregate, sand, pozzolans, fly ash, fibers, plastic, and mixtures thereof.

31. The process of claim 28 wherein the cementitious composition is a controlled low strength material.

32. A process for preparing a cementitious composition mixture including a) providing ingredients
i) at least one cementitious composition
ii) at least one admixture material and
iii) a liquid;

wherein the at least one admixture material comprises at least one compacted unit of an amount of said admixture material, said unit characterized by having strength sufficient to maintain structural integrity during handling and storage, but having at least one of sufficient solubility and sufficient friability upon mechanical agitation within a wet mixing environment of a cementitious composition mixture to at least one of dissolve and fragment for uniform dispersal throughout said cementitious composition mixture; and b) combining ingredients i), ii) and iii) and c) mixing the ingredients i), ii) and iii) to at least one of dissolve and fragment the at least one compacted unit to substantially disperse the admixture material throughout the ingredients i) and iii).

33. The process of claim 28 wherein the cementitious composition mixture contains water.

34. The process of claim 32 wherein the cementitious composition mixture additionally contains an ingredient other than the admixture material selected from the group consisting of aggregate, sand, pozzolans, fly ash, fibers, plastic, and mixtures thereof.

35. The process of claim 32 wherein the cementitious composition is a controlled low strength material.

* * * * *